Dec. 15, 1970    J. E. GEUSIC ET AL    3,548,199
PARAMETRIC DEVICES UTILIZING $Ba_2Na\,Nb_5O_{15}$
Filed March 28, 1968
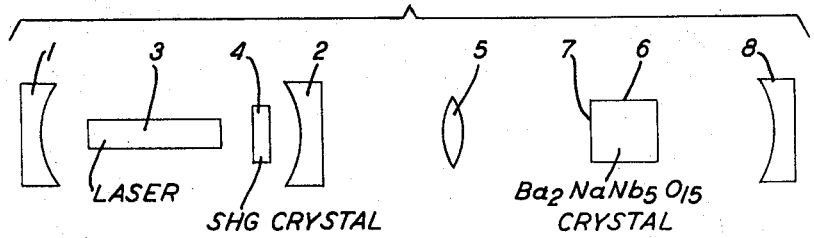
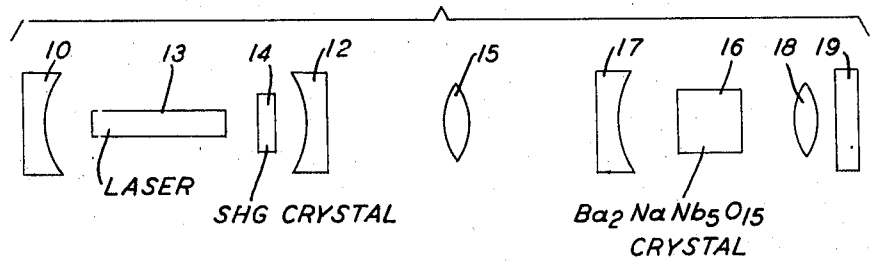
INVENTORS J. E. GEUSIC
S. SINGH
R. G. SMITH
BY
ATTORNEY

United States Patent Office

3,548,199
Patented Dec. 15, 1970

3,548,199
PARAMETRIC DEVICES UTILIZING Ba$_2$NaNb$_5$O$_{15}$
Joseph E. Geusic, Berkeley Heights, and Shobha Singh and Richard G. Smith, Summit, N.J., assignors to Bell Telephone Laboratories, Incorporated, Murray Hill and Berkeley Heights, N.J., a corporation of New York
Filed Mar. 28, 1968, Ser. No. 716,955
The portion of the term of the patent subsequent to Jan. 21, 1986, has been disclaimed
Int. Cl. H03f 7/00
U.S. Cl. 307—88.3                                    8 Claims

ABSTRACT OF THE DISCLOSURE

A low threshold, solid state, optical parametric oscillator utilizing Ba$_2$NaNb$_5$O$_{15}$ as the nonlinear medium is capable of operating continuously over a broad frequency range including the visible band.

BACKGROUND OF THE INVENTION

Field of the invention

The invention is concerned with parametric devices capable of operating over a broad frequency bandwidth including visible frequencies. Of specific interest are low threshold devices capable of operating continuously which may be utilized to extend the frequency availability of coherent visible radiation available from laser oscillators.

Description of the prior art

With the development of the solid state laser technology, it has become increasingly apparent that devices oscillating at wavelengths substantially below about 7,000 angstrom units will not become available, at least in the near future. Further, even the number of different frequencies at longer wavelengths available from such sources is severely limited particularly for continuous (CW) operation due to the very small number of efficient laser materials which have been developed. Nevertheless, many predicted uses will require operation at shorter wavelengths and also at a variety of different frequencies. The foremost example of the latter is perhaps in communications due to the need for different carrier frequencies.

Recognizing this need, considerable effort has been directed toward devices useful for frequency conversion. Materials required in such devices are known as "nonlinear" materials. They owe their utility to the fact that their electric polarizability is intensity dependent so giving rise to the possibility of the interchange of energy between transmitting beams of differing frequencies.

The first demonstrated use of such nonlinear materials took the form of second harmonic generators (SHG). As the name implies, such device uses accomplish frequency doubling thereby resulting in twice as many available frequencies from a given number of laser materials. Various material and design advantages now permit efficient operation of such SHG devices, and they are considered an established part of the laser technology.

It was early recognized that the nonlinear materials useful for SHG could also serve in parametric devices (oscillators, mixers, etc.). It was immediately realized that combination of a parametric oscillator and an SHG device operating from the available solid state laser sources could permit operation over the entire frequency range up to the vicinity of the harmonic frequency.

The first demonstration of a working parametric oscillator at optical frequency was described by J. A. Giordmaine and R. C. Miller—vol. 14, Physics Review Letters, p. 973 (June 14, 1965). Since that time, other operating parametric oscillators have been reported by other workers at Bell Telephone Laboratories and by one group in Russia. All such reported parametric oscillators used high peak power, Q-switch lasers to pump the oscillators. Pump power levels reported range from $10^4$ watts to $10^7$ watts. Since such power levels have been available only from pulsed devices, reported parametric oscillators have not been capable of continuous output.

SUMMARY OF THE INVENTION

A family of low threshold parametric devices is described. An exemplary oscillator has operated continuously at a pump level of less than $10^{-1}$ watt.

The high efficiency achieved in the inventive devices, as contrasted with those previously reported, is due mainly to:

(1) the extremely efficient phase matchable, non-damagable, nonlinear composition Ba$_2$NaNb$_5$O$_{15}$, see vol. 11, Applied Physics Letters, p. 269 (November 1967) and (2) design of a particularly efficient resonant structure, so further increasing the efficiency of the nonlinear medium.

The contribution made by Ba$_2$NaNb$_5$O$_{15}$ is apparent. This hard, easily polished, chemically and physically durable material has a transparency bandwidth from about 40,000 angstrom units to about 4,000 angstrom units. It has sufficient birefringence to permit phase matching over the entire range of operating frequencies at reasonable operating temperatures for incoming beams perpendicular to the optic axis. The nonlinear coefficient is by far the best measured in any phase matchable material useful in the visible range and optical damage (local inhomogeneities in refractive index) does not appear under normal operating conditions.

The most significant feature of the apparatus design is the cavity configuration used for the parametric element. Structurally, such cavities utilize at least one focusing element. Suitable arrangements may include one or two curved mirrors and/or a lens element. Mirrors and/or lens may, of course, be external to the parametric body or may constitute a part of the element itself.

It is considered that optimum operation demands that certain limits be placed on the nature of the elements which together make up the resonant parametric cavity. Generally, it is desirable to maximize the energy density of the various fields within the cavity. Concerned parameters are interdependent so that for a given length of crystal there is a cavity configuration giving optimum results and a range of cavity configuration, including the optimum, which will give rise to acceptable operation. These cavities, regardless of their specific configuration, are characterized by a quantity, $b$, termed the "confocal parameter." The value of $b$, referred to the index of refraction of air, at optimum has the value $$b_{opt} = \frac{l_{crystal}}{2.8\, n_{crystal}}$$

where $l_{crystal}$ is the length of the $Ba_2NaNb_5O_{15}$ crystal employed and $n_{crystal}$ is the index of refraction of the $Ba_2NaNb_5O_{15}$ crystal.

The range of acceptable operation, defined as the range over which the power needed to sustain oscillations is less than ten times the minimum is given by $$\frac{l_{crystal}}{100 \, n_{crystal}} < b < \frac{10 l_{crystal}}{n_{crystal}}$$

In the foregoing, it is assumed that the incoming pump beam approximately conforms with the parametric signal and idler beams within the parametric crystal. Unless this is true within the limits stated (in terms of $b$), there cannot be efficient interaction between pump and signal. The assumption is reasonable since parametric beam position and configuration (determined by the parametric cavity) are simply matched by use of a pump lens. Simply stated, the pump focusing means should have a focal length such that it transforms the pump beam so that it has a confocal parameter equal to that of the parametric cavity for optimum operation.

The limits based on a permissive increase of threshold by one order of magnitude are required for efficient CW operation. For practical operation, it is often desirable to deviate from optimum conditions to permit latitude in focusing sometimes required, for example, by reason of slight beam spreading or deflections due to index inhomogeneities.

BRIEF DESCRIPTION OF THE DRAWING

FIG. 1 is a schematic representation of apparatus including one form of parametric device according to the invention; and FIG. 2, also a schematic representation, depicts apparatus including an alternative form of a parametric device.

DETAILED DESCRIPTION

(1) Composition

Inventive structures are dependent upon the nonlinear $Ba_2NaNb_5O_{15}$. This material, which must be present as a substantially perfect single crystal, is orthorhombic having at times been described as substantially tetragonal. Since its structure is essentially that of the traditional tetragonal form of "tungsten bronze," it is often referred to in these structural terms. As has been developed, this structure has particularly advantageous properties for nonlinear use (vol. 11, Applied Physics Letters, p. 269 (November 1967)). It has a large nonlinear coefficient, is phase matchable normal to the optic axis over an appropriate temperature range and is otherwise possessed of such properties as, at the present time, make it uniquely adaptable to structures of the type described.

In consequence for the purposes of the inventive teaching, no substantial deviation is to be permitted from the recited composition. No intentional or unintentional solute materials are desirably included; and since additional ingredients in general will be present in indeterminate amount (unlike the elements necessary to the composition which are fixed by valence balancing), such inclusions may result in inhomogeneities, and consequently in scattering, within the parametric element.

$Ba_2NaNb_5O_{15}$ crystals are readily growth by a number of techniques including Czochralski growth, Bridgeman growth, flux growth, etc.

(2) Structure

The permitted cavity configurations for use with the parametric crystal is characterized by one or more focusing elements. Such elements may be separate from or be integral with the parametric crystal. They may include one or more curved mirrors and/or one or more lenses. It is the function of the focusing element(s) to produce the greatest possible energy concentration within the crystal. The focal length of the focusing means for optimum operation is dependent upon the number of such means and their positioning relative to the crystal.

In the arrangement utilized in the example, there was one flat reflecting surface integral with the parametric crystal which, together with a separate curved mirror, constituted the resonant cavity. Focal length and positioning were selected such as to result in greatest energy concentration adjacent the flat reflecting end of the crystal. For the arrangement which includes two separate curved mirrors, optimum operation dictates a focal point midway through the crystal. Optimization of other arrangements is evident from the following description. General design parameters are discussed in terms of the apparatus of FIG. 1 which is described.

Curved mirrors 1 and 2 together with laser oscillator 3 and SHG element 4 form a coherent light source with an output frequency which sets a maximum limit on the output frequency of the parametric element. While SHG element 4 is not in principle required, its use represents the best means for producing coherent radiation at a visible frequency from a solid state source. Since the $Ba_2NaNb_5O_{15}$ parametric device, in accordance with the invention, has a low threshold, it is feasible to operate with a gas laser at visible frequency so obviating the need for SHG element 4.

The most efficient solid state laser at this time, at least for CW use, is yttrium aluminum garnet-neodymium. For this example, initial laser operation is at 10640 angstrom units so that the SHG-produced radiation leaving element 2 is at twice this frequency or at 5320 angstrom units. The only requirement of the structure including elements 1 through 4 or its substitute is that it operates over a frequency range to which $Ba_2NaNb_5O_{15}$ is substantially transparent. As indicated, this range is from 40,000 angstrom units to 4,000 angstrom units. Since most parametric devices result in down conversion, pump sources more usefully approach the short wavelength limit than the long.

It has been indicated that the pump may be such as not to require an SHG element 4. In other arrangements, it may be desirable to use some higher harmonic. One proposed method is to incorporate an additional SHG element.

A significant aspect of the inventive devices is that they are capable of operating continuously. Nevertheless, the very low threshold resulting from the incorporation of the inventive features also makes possible more efficient pulsed operation. Accordingly, the pump includes a pulsed laser.

Coherent emission passing through partially reflecting mirror 2 is then focused by lens 5 so as to come to a focal point within the parametric oscillator cavity which includes elements 6 and 8. Of these, element 6 is a crystal of the $Ba_2NaNb_5O_{15}$ which is coated at surface 7 with a dielectric coating having significant transmission at the frequency of the pump. The oscillator cavity is defined by coating 7 and by separate curved mirror 8 also provided with a dielectric coating of the approximate properties of that utilized at 7. The interior face of the oscillator crystal 6 as well as nonreflecting interior surface of elements 3 and 4 in the propagation direction are also coated with an anti-reflection coating.

FIG. 2 depicts an apparatus alternative to FIG. 1 in which elements 10, 13, 14, 12, 15 and 16 perform the functions of elements 1, 3, 4, 2, 5 and 6, respectively, of FIG. 1. The arrangement differs in the substitution of curved mirror 17, for flat reflecting surface 7, and of double convex lens 18 and flat reflecting element 19 together for element 8. Alternative structures utilizing one or more curve reflecting surfaces integral with the crystal are apparent.

(a) Design parameters

Spacing considerations are discussed largely in terms of the apparatus of the type depicted in FIG. 1. These considerations are generalized to result in the limitation set forth under Summary of the Invention.

Threshold power for most practical operation is related to certain other parameters according to the approximate expression:

$$P_{th} = 3.2\alpha_1\alpha_2 b/l^2 \qquad \text{Eq. 1}$$

where:

$P_{th}$ is the threshold power in milliwatts,
$\alpha_1$ and $\alpha_2$ are the roundtrip losses at the signal and idler measured in percent,
$b$ is the confocal parameter of the cavity in centimeters and
$l$ is the crystal length in the propagation direction in centimeters.

Accordingly, it is seen that minimization of required pump power, in turn, requires minimization of the ratio $b/l^2$. The value of $b$ is related to spacing, $d$, and radius of curvature R by the expression:

$$b^2 = 4d(R-d) \qquad \text{Eq. 2}$$

where:

$d$ is the spacing in the propagation direction between the flat and curved reflecting ends of the parametric cavity and
R is the radius of curvature of the curved reflecting surface in compatible units.

The value of $d$ further incorporates the index of refraction of medium 6 by $$d = l_{air} + \frac{l_{crystal}}{n_{crystal}} \qquad \text{Eq. 3}$$

where:

$l_{air}$ and $l_{crystal}$ are the associated lengths and $n_{crystal}$ the index of refraction of the crystal.

It is evident that as $d$ is varied $b$ can take on any value between the limits of O and R. The dependence of $b$ on $d$ is most sensitive where $d$ is approximately equal to R so imposing a practical limit on the minimum threshold power which may be applied (from Eq. 1).

EXAMPLE

Operation was carried out with $R = .8$ inch and $R-d$ approximately equal to $10^{-2}$ inch which was equivalent to operation at two or three times minimum threshold power.

The arrangement shown in FIG. 1 was operated utilizing a 5320 angstrom unit pump resulting from use of a 10640 angstrom unit yttrium aluminum garnet-neodymium laser together with a $Ba_2NaNb_5O_{15}$ SHG element. Reflecting surfaces 1 and 2 were designed to be highly reflecting at 10640 angstrom units. Approximately 300 milliwatts of pump power in the $TEM_{00}$ mode was available. The oscillator crystal was 5 mm. long and was polished flat and parallel and permitted phase matched operation without double refraction utilizing the nonlinear coefficient $d_{31}$. One face of the crystal and a separate curved mirror with a radius of curvature of 3 cm. formed the oscillator cavity. These surfaces (7 and 8) were coated with dielectric coatings having a peak transmission of .1% at band center and a transmission of greater than 80% at 5320 angstrom units. The interior face of the oscillator crystal was coated with an antireflection (AR) coating. The separation of mirrors 7 and 8 was carefully adjusted in order to give a confocal parameter $b$ for the oscillator cavity of 5 mm. This particular value was chosen as a compromise between a value of $b$ giving optimum parametric gain and hence minimum threshold and one with reasonable alignment tolerances. The lens 5 was chosen to mode match the pump into the cavity (i.e., $b_{pump} = b_{cavity}$).

Once oscillation was achieved it was tuned from 9800 angstrom units to 11600 angstrom units by varying the temperature of the parametric crystal from 97 to 103° C. and observing the output with a spectrometer and photomultiplier. Oscillation threshold was determined by reducing the lamp voltage of the yttrium aluminum garnet-neodymium laser. Using a calibrated thermopile, the 5320 angstrom unit power incident upon lens 5 at threshold was found to be approximately 45 milliwatts. Using the same thermopile, the total signal and idler radiation emitted from one end of the cavity was found to be approximately 1.5 milliwatts with 300 milliwatts of pump power incident. The total power from both ends was thus 3 milliwatts for an over all conversion efficiency of 1%.

The invention has been described in terms of a limited number of embodiments. It has been stated that the inventive concept derives from the use of $Ba_2NaNb_5O_{15}$ as the nonlinear material in a particular parametric structure, which includes at least one focusing element of such curvature and so positioned as to set the requirement, that $$\frac{b}{l} \simeq 1$$

within the limits $$\frac{l_{crystal}}{100\, n_{crystal}} < b < \frac{10\, l_{crystal}}{n_{crystal}}$$

in which:

$l_{crystal}$ is the length of the said single crystal in the propagation direction,
$n_{crystal}$ is the refractive index of the said single crystal, and
$b$ is the confocal parameter of the said cavity.

It is clear that the example in terms of CW parametric oscillation is merely exemplary.

What is claimed is:

1. Parametric device comprising a nonlinear medium, means for introducing coherent electromagnetic radiation of a first frequency into said medium, means for supporting coherent electromagnetic radiation of a second frequency within the said medium, and means for extracting radiation from the said supporting means, the said first and second frequencies being related in such manner as to permit an interchange of energy therebetween, in which the said medium is a single crystal consisting essentially of the composition $Ba_2NaNb_5O_{15}$ and in which the means for supporting said second frequency is a resonant cavity which includes a focusing means for focusing electromagnetic radiation of said second frequency within said supporting means, said focusing means being such that the following relationship obtains:

$$\frac{l_{crystal}}{100 n_{crystal}} < b < \frac{10 l_{crystal}}{n_{crystal}}$$

in which:

$l_{crystal}$ is the length of the said single crystal in the propagation direction,
$n_{crystal}$ is the refractive index of the said single crystal, and
$b$ is the confocal parameter of the said cavity.

2. Device of claim 1 in which the said cavity is defined by a flat reflecting end and a curved reflecting end and in which:

$b$ is defined by the relationship $b^2 = 4d(R-d)$,
in which:
$d$ is the distance between the said reflecting surfaces, and
R is the radius of curvature of the curved surface.

3. Device of claim 1 together with means for generating said coherent electromagnetic radiation of the said first frequency.

4. Device of claim 3 in which said generating means includes a solid state laser oscillator.

5. Device of claim 4 in which said generating means additionally includes a second harmonic generating element.

6. Device of claim 5 in which said second harmonic generating element consists essentially of a single crystal of the composition $Ba_2NaNb_5O_{15}$.

7. Device of claim 1 together with means for varying the frequency at which noncritical phase matching occurs in the said medium.

8. Device of claim 7 in which the said adjusting means includes means for varying the temperature within the said medium.

References Cited
UNITED STATES PATENTS
3,423,686   1/1969   Ballman et al. -------- 330—4.5

ROY LAKE, Primary Examiner

D. R. HOSTETTER, Assistant Examiner

U.S. Cl. X.R.

321—69; 330—4.5; 331—107